(No Model.)

A. H. HANDLAN, Jr.
LOCOMOTIVE HEAD LIGHT.

No. 305,306. Patented Sept. 16, 1884.

Attest:
Charles Pickles
Geo. H. Wheelock

Inventor:
Alexander H. Handlan Jr.
By Knight Bro.
Attys

UNITED STATES PATENT OFFICE.

ALEXANDER H. HANDLAN, JR., OF ST. LOUIS, MISSOURI.

LOCOMOTIVE HEAD-LIGHT.

SPECIFICATION forming part of Letters Patent No. 305,306, dated September 16, 1884.

Application filed January 17, 1884. (No model.)

*To all whom it may concern:*

Be it known that I, ALEXANDER H. HANDLAN, Jr., of the city of St. Louis, in the State of Missouri, have invented a certain new and useful Improvement in Locomotive Head-Lights, of which the following is a full, clear, and exact description, reference being had to the accompanying drawings, forming part of this specification.

The present invention is in some respects an improvement on the invention described in Letters Patent of the United States granted to me July 24, 1883, No. 281,867.

Reference is made to the claims for statement of the invention.

Figure 1:
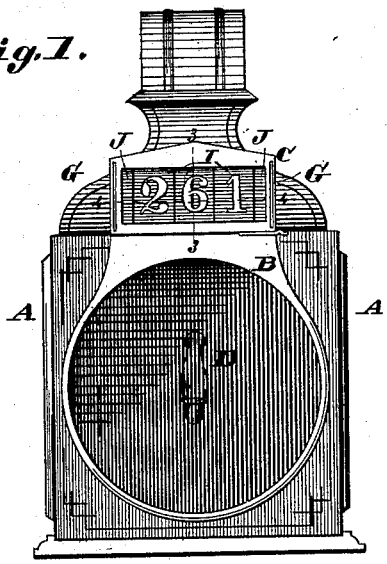
Figure 2:
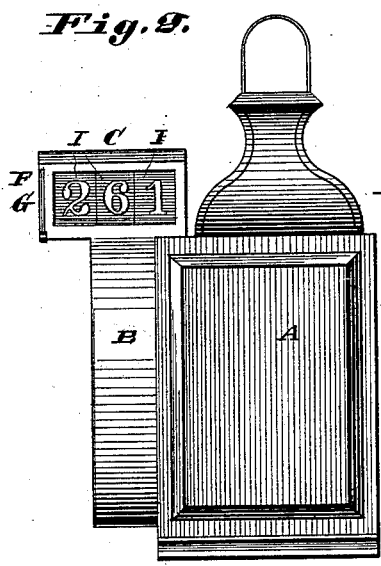
Figure 3:
Figures 4, 5, 6:
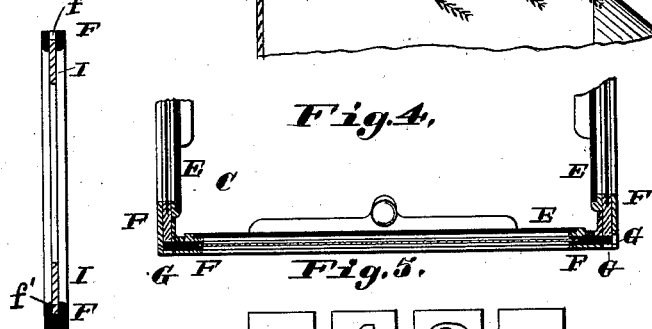
Figure 7:

Figure 1 is a front view of a head-light with my improvement applied thereto. Fig. 2 is a side view of same. Fig. 3 is an enlarged detail longitudinal section at 3 3, Fig. 1. Fig. 4 is an enlarged detail horizontal section at 4 4, Fig. 1. Fig. 5 is a front view of stencil figure-plates and blank-plates. Fig. 6 is an enlarged vertical section of the frame and number-plate at 6 6, Fig. 3. Fig. 7 is a detail front view showing a manner of securing the front number-frame in position.

The body of the head-light case is shown at A.

B is the rim containing the ordinary glass.

C is the signal-chamber whose interior is illuminated by the head-light lamp D. The front and sides of the signal-chamber have glass or other transparent panes or plates E, and either on the inside or outside of said panes there are removable frames to contain the signal-numbers, (indicating the number of the locomotive or of the train, according to the practice followed by the railroad using them.) These frames F may be held in position in any suitable manner. I show the frames upon the outer side of the glass panes.

G are slots in the front of the signal-chamber, into which the slides or frames F are inserted horizontally, the edges of the frames sliding in grooves at top and bottom. The front frame is inserted in the same manner through a slot, G, in one side of the signal-chamber. The side frames are pushed in a sufficient distance to allow the front frame to pass in front of their front ends, so that when the front frame is inserted it holds the side frames in position. The front frame is held in position by a spring-catch, H, engaging its outer end, its inner end bearing against the side of the signal-chamber. The frames are made with a vertical slot, $f$, in their upper bar, through which the figure-plates I and the blank-plates J may be dropped into place in the frame. The lower edges of the plates I and J enter a groove, $f'$, in the upper side of the lower bar of the frame, the slot and groove extending about from end to end of the frame, so that the whole open space may be occupied by the plates I and J, so that all light issuing from the front and sides of the signal-chamber shall be transmitted through the number-openings of the stencil-plates I.

The frames F may be made to receive four of the plates I J, more or less. When the frame is made to contain an even number of the plates J and an odd number of the plates I, it will be seen that, to bring the numbers centrally in the frame, end plates, J, of one-half width, must be used, as seen in Fig. 1. The same thing would follow if the space in frame F were made to contain an uneven number of the plates I J and an even number of plates I should be used.

I do not limit my claim to the described manner or any particular manner of securing the stencil number-plates I in the head-light; but

What I claim as new and of my invention is—

1. In combination with a head-light, the signal-chamber having vertical slots in front to receive side frames, and vertical slot at the side for the insertion of the front frame in advance of the outer ends of the side frames to retain them to their seats, as set forth.

2. The combination, with a locomotive head-light, of removable frame F, containing number-plates I, made movable in the frame, and blank plate or plates J, removable or interchangeable in the frame, for the purpose set forth.

ALEXANDER H. HANDLAN, JR.

Witnesses:
SAML. KNIGHT,
GEO. H. KNIGHT.